United States Patent
Helmsderfer

[19]

[11] Patent Number: 6,028,627
[45] Date of Patent: Feb. 22, 2000

[54] CAMERA SYSTEM FOR CAPTURING A SPORTING ACTIVITY FROM THE PERSPECTIVE OF THE PARTICIPANT

[76] Inventor: John A. Helmsderfer, 2151 Luray Ave., Cincinnati, Ohio 45206

[21] Appl. No.: 08/868,680

[22] Filed: Jun. 4, 1997

[51] Int. Cl.[7] .................................................. H04N 7/18
[52] U.S. Cl. ........................ 348/157; 348/161; 348/374; 345/8
[58] Field of Search .................... 348/157, 158, 348/161, 162, 374, 375, 376, 373; 345/7, 8; 224/181, 908; 396/373; H04N 7/18

[56] References Cited

U.S. PATENT DOCUMENTS

| | | | |
|---|---|---|---|
| 2,369,829 | 2/1945 | Johnson ........................................ | 95/12 |
| 3,900,140 | 8/1975 | Kelso et al. .................................. | 224/5 |
| 4,051,534 | 9/1977 | Dukich et al. ............................ | 358/210 |
| 4,270,679 | 6/1981 | Gildea et al. ............................. | 224/181 |
| 4,449,787 | 5/1984 | Burbo et al. .............................. | 350/538 |
| 4,457,461 | 7/1984 | Docking et al. .......................... | 224/181 |
| 4,462,525 | 7/1984 | Pingleton et al. ........................ | 224/210 |
| 4,516,157 | 5/1985 | Campbell .................................. | 358/108 |
| 4,539,601 | 9/1985 | Komine ..................................... | 150/50 |
| 4,545,414 | 10/1985 | Baum ........................................ | 150/52 |
| 4,561,576 | 12/1985 | Lowe et al. ............................... | 224/209 |
| 4,616,257 | 10/1986 | Kloots et al. ............................... | 358/93 |
| 4,621,283 | 11/1986 | Feinbloom ................................ | 358/93 |
| 4,786,966 | 11/1988 | Hanson e tal. ........................... | 358/108 |
| 4,797,736 | 1/1989 | Kloots et al. ............................... | 358/93 |
| 4,837,817 | 6/1989 | Maemori .................................. | 358/224 |
| 4,884,137 | 11/1989 | Hanson et al. ........................... | 358/108 |
| 4,953,766 | 9/1990 | Cruickshank ............................ | 224/181 |
| 4,961,626 | 10/1990 | Fournier, Jr. et al. ................... | 350/174 |
| 4,970,589 | 11/1990 | Hanson et al. ........................... | 358/108 |
| 4,976,352 | 12/1990 | Nordstrom ............................ | 206/316.2 |
| 5,005,213 | 4/1991 | Hanson et al. ........................... | 455/617 |
| 5,200,827 | 4/1993 | Hanson et al. ........................... | 358/211 |
| 5,420,828 | 5/1995 | Geiger ...................................... | 367/131 |
| 5,462,214 | 10/1995 | Buswell .................................... | 224/229 |
| 5,546,072 | 8/1996 | Greuserence et al. .................. | 340/574 |
| 5,583,571 | 12/1996 | Friedland ................................. | 348/373 |
| 5,610,678 | 3/1997 | Tsuboi et al. ............................ | 396/373 |
| 5,675,112 | 10/1997 | Giry et al. ............................... | 89/41.06 |
| 5,684,498 | 11/1997 | Welch et al. ................................. | 345/8 |
| 5,856,811 | 2/1999 | Shih et al. .................................... | 345/8 |
| 5,880,812 | 3/1999 | Solomon .................................. | 351/210 |
| 5,886,739 | 3/1999 | Winingstad .............................. | 348/158 |

*Primary Examiner*—Howard Britton
*Assistant Examiner*—Tung Vo
*Attorney, Agent, or Firm*—Wood, Herron & Evans, LLP

[57] ABSTRACT

A camera system for capturing the sporting activity from the perspective of the participant comprises a mount structure configured for being positioned proximate a mouth guard of a safety helmet, and a securement device coupled to the mount structure for securely engaging the mouth guard for securely holding the mount structure thereto. The system further comprises a camera and an adjustment mechanism coupled to the mount structure and configured for receiving a camera when the adjustment mechanism tiltably engages the camera for vertically moving the camera up and down on the helmet such that the camera records generally on the line of sight of a participant wearing the helmet.

10 Claims, 3 Drawing Sheets

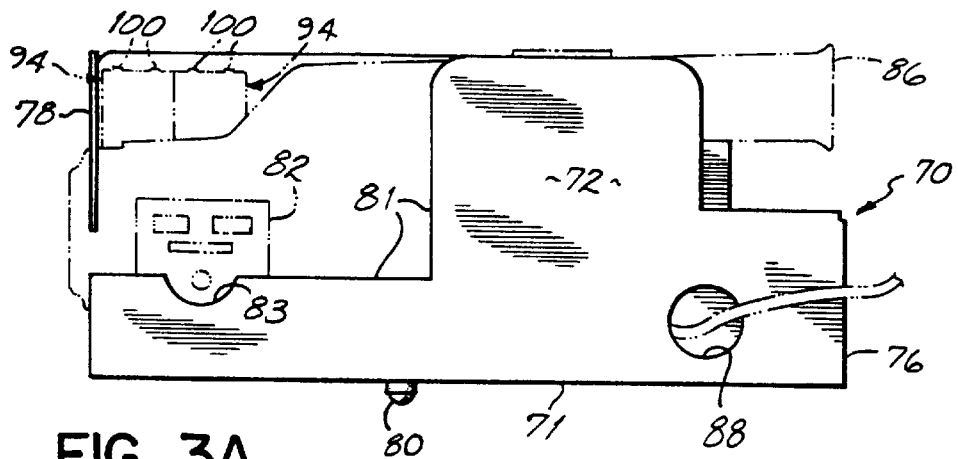
FIG. 3A
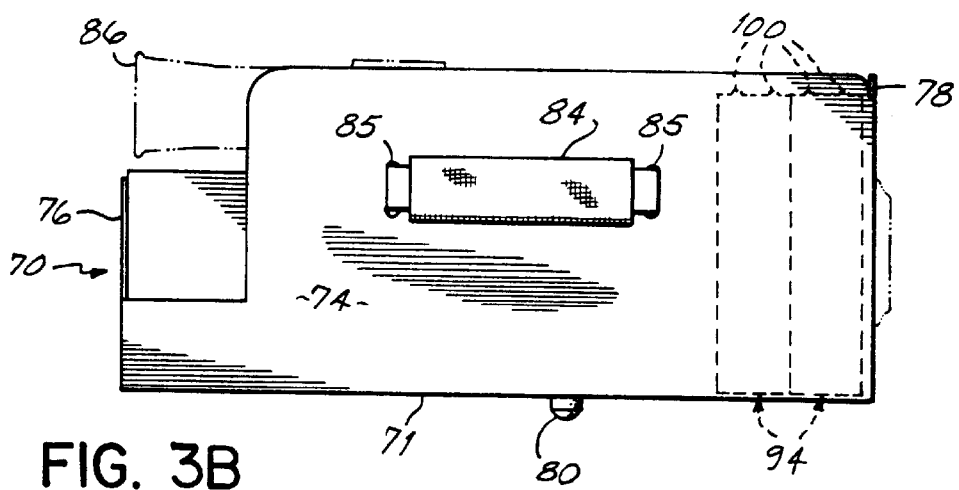
FIG. 3B
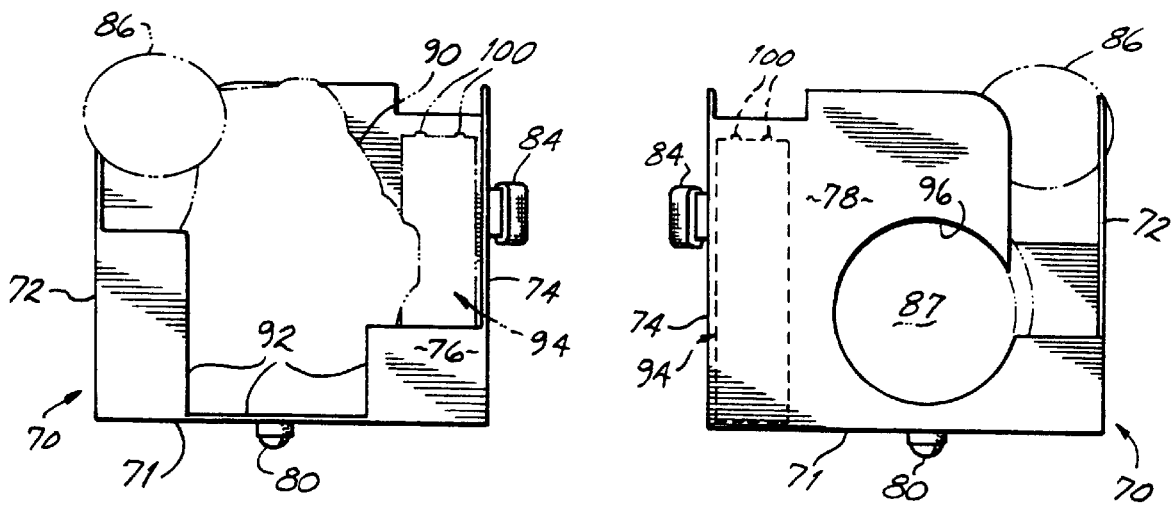
FIG. 3C
FIG. 3D

CAMERA SYSTEM FOR CAPTURING A SPORTING ACTIVITY FROM THE PERSPECTIVE OF THE PARTICIPANT

FIELD OF THE INVENTION

The present invention relates to camera systems and particularly to a camera system worn by a participant during a sporting activity while recording the sporting activity.

BACKGROUND OF THE INVENTION

Sporting activities, such as mountain biking, off-road motorcycle riding, downhill skiing, snowmobiling, auto racing and hand gliding frequently involve covering considerable distances, at high speed and with constantly changing body positions. Many enthusiasts and participants in these sporting activities and other high-intensity sporting activities are intensely interested in their respective sports and often like to make and view video recordings of their participation in the sporting activity.

Traditionally, such recordings are made by a second party capturing the participant on tape with a video camera recorder unit which are well known and readily available. However, such a recording lacks the thrill factor experienced by the participant. Furthermore, the participant would usually rather record the activity from the perspective they experience while participating in the activity. That is, they want to record the sporting activity exactly as they saw, heard and felt it, as opposed to the perspective of another party viewing their performance. They can then use the video tape recording to improve their skills, reminisce and share their enthusiasm with family and friends.

Furthermore, a second party recording will normally include only the sounds and narration of the camera operator and would not include the voice of the participants or the sounds that they experience. Recordings are usually more interesting, memorable, and desirable to listen to when they capture the audio images of the activity as well as the video images.

Video tape recordings of events in which a participant may be involved are available through some professional video production companies. For example, a ski resort may offer to film a skier as a memento of their trip. However, these recordings are second person recordings and they do not capture the experience from the participant's point of view. Furthermore, smaller events and informal outings with friends do not warrant the attention of professional production companies and thus, to make a recording, the participant must find a person to hold and operate the camera equipment. If a person is alone in their participation, such as is often the case with motorcycle riding or skiing, they usually cannot capture the event on video tape.

Additionally, the video camera recorders and commercial video equipment which are available for use by the general public are often inadequate for capturing the sporting activity because of the physical nature of the activity. For example, available equipment is cumbersome and in many cases is impossible to use while skiing or while operating a vehicle such as a snowmobile or motorcycle. Despite the inadequacies of video available equipment, many attempts are made in adapting available video equipment for capturing sporting activities on video tape. Skiers have tried to ski while holding, in their hands, a video recorder. This is not only dangerous, but also inadequate because the camera bounces around as the skier moves. The skier's performance is also hampered. Additionally, motorcyclists have tried to secure a video recorder to their motorcycle or to their helmet, but have not had much success in capturing the activity with stable, easily-viewed video images. Still further, snowmobilers have tried to affix a recorder behind the windshield of the snowmobile. Despite these efforts, the end results and the captured video images are still inadequate. As mentioned, these types of methods also hinder the participant's performance and have otherwise infringed on their enjoyment of the sporting activity.

Another drawback is using existing equipment, in this way, is the expense of the equipment and damage which may occur thereto during the activity. If a skier should fall or a motorcycle rider should wreck, which occurs quite often, the video camera recorder will fall to the ground from the skier's hands or on the motorcycle. Video records are delicate and will certainly be damaged if not ruined by most accidents of this nature.

Several previous inventions have been directed to capturing video images will maintaining the participant's hands free to move and handle other activities. However, the prior art devices require additional equipment or specially modified equipment not normally worn by the participant.

For example, U.S. Pat. No. 4,953,766 discloses a camera mounted to the side of a frame which fits on a wearer's head. However, the device of the patent creates an off-center camera angle several inches to the right or left of the participant's line of sight. The camera mounting structure also must be worn on the head and would prevent the use of a helmet, which is a very undesirable situation in potentially dangerous sporting activities. The camera and mounting structures also create an unnatural weighted feeling to the side of the wearer's head. Still further, the camera equipment is left exposed to the elements creating a situation where by the equipment may be damaged. For instance the lens of the camera or the camera device itself may be broken by flying mud, rocks and related debris one encounters, such as while aggressively riding motorcycles in an off-road environment.

U.S. Pat. No. 4,516,157 discloses an eyeglass in which a camera and viewfinder are combined. Many participants in the aforementioned sporting activities are very particular about the type of equipment they use. This device forces them to use the specially formed glasses which are uncomfortable and may prevent the use of other necessary equipment. For instance, skiers generally wear sunglasses or double pane goggles, while motorcross riders wear single pane goggles and an open-face helmet with a wrap around mouth guard or chin guard. Snowmobilers on the other hand do not wear goggles, but prefer a full face helmet with a mouth guard and a shield to serve the purpose of goggles. The glasses required would interfere with the use of this necessary equipment and also may interfere with the participant's vision.

Additionally, prior art equipment requires specially made, expensive recording equipment to record the images captured by the camera unit. As will be appreciated, it is not very practical nor cost effective for sports enthusiasts to have to purchase and utilize specialized video recorded equipment in additional to their existing equipment. Commercially available video records are becoming ever more popular and are perfectly suited for capturing vacation scenes, parties and innumerable other events. Many sports enthusiasts have existing recorders which cannot be used prior art camera units. Therefore, a sports enthusiast will have to purchase two separate recorders and if they go on a vacation involving a sporting activity, such as motorcycle riding, they will have to carry both sets of equipment. They certainly will not want to use the reporting camera equipment for the normal videography, and as discussed above, conventional video camera recorders are not suited for capturing sporting activities from the participant's perspective.

It is therefore an objective of the present invention to provide a video camera system for use in recording participation in a sporting activity, and particularly in recording the sporting activity participation from the perspective of the participant.

It is further an objective of the invention to provide a video camera system which may be easily and readily used by the participant while engaged in the sporting activity and which will capture the audio images proximate the participant.

It is still another objective to record a sporting activity from the participant's perspective with adjustability in the system for capturing the activity in the line of sight of the participant.

It is another objective of the invention to utilize conventional video recording equipment and eliminate the need for more expensive specialized records and the costs associated therewith.

It is still another objective to maintain the conventional video recorder in a state where it can be readily used to make a convention recording.

It is yet another objective to film a sporting activity from the participant's perspective while interfering very little with the necessary equipment utilized in the activity or the vision of the participant.

It is another objective of the invention to provide a camera system which is easy to operate during the sporting activity, is not cumbersome to wear during the sporting activity and is readily and easily connected and disconnected in between successive sessions of the sporting activity.

SUMMARY OF THE INVENTION

The camera system of the invention captures a sporting activity from the perspective of the participant and is mountable on a safety helmet having a mouth guard or chin guard. The camera system comprises a mount structure configured for being positioned proximate the mouth guard of the safety helmet to lie generally coextensive with a portion of the mouth guard. The mount structure is positioned on almost any helmet having a suitable mouth guard. In a preferred embodiment, the mount structure is U-shaped and has a substantial width for lying coextensive with a large portion of the mouth guard to provide stability to the mount structure. The mount structure comprises a generally rigid yet flexible outer layer attached to a foam inner layer which engages the mouth guard of the helmet. A front portion of the mouth structure is aligned with the front portion of the helmet mouth guard whereas side portions of the U-shaped mount structure wrap around the sides of the mouth guard and preferably a side portion of the helmet to provide stable mounting of the camera of the invention.

A securement device is coupled to the mount structure and is operable for securely engaging the helmet mouth guard to hold the mount structure thereto. In one embodiment of the invention, the securement device includes a plurality of straps which wrap around the side portions of the mount structure and the side portions of the mouth guard, simultaneously, to secure the mount structure to the helmet. The straps may include hook and loop fasteners or other suitable fastening structures for holding them in a wrapped position.

A camera is securely held to the front of the mount structure by an adjustment mechanism which is coupled to the mount structure and configured for receiving the camera. The adjustment mechanism comprises opposing tabs which extend forwardly of the helmet when the mount structure is secured to the helmet. An adjustment mechanism includes a horizontally disposed axle which extends through a case holding the camera and thus tiltably engages the camera so that the camera may be rotated vertically up and down on the helmet to adjust the line of sight of the camera lens. Nut structures are provided at the ends of the axles to draw the tabs inwardly to grip the camera case and thus hold the camera at a set angle. The camera is thus adjustable to record a video image in the line of the sight of the participant wearing the helmet.

The system includes a microphone remote from the camera, the microphone is positioned internally of the helmet proximate the mouth guard. The remote microphone records audio, such as the participants' voice during a sporting activity. Since the microphone is located inside the helmet, it is generally maintained away from external noises and debris, such as wind noises and flying rocks, sticks or snow.

A recording unit is coupled to the camera and microphone through a record line which includes a disconnect plug. The disconnect plug is positioned proximate the mount structure and thus the camera and microphone may be disconnected from the recording unit and the helmet may be removed without affecting the position of the recording unit or requiring the participant to otherwise adjust his equipment. The recording unit is preferably worn around the waist of the participant and includes a belt-like structure for securing the recording unit to the participant's body.

The recording unit, in a preferred embodiment of the invention, includes a conventional self-contained video camera recorder which is known in the art. The invention comprises a shield removably contained inside of a pliable bag having a belt device attached thereto. The bag and shield are thus attached around the waist of the participant. The shield is mounted to the recorder and includes a protective base and end and side walls for preventing damage to the recorded. The sidewalls are appropriately cut away to expose the controls of the recording unit. An end wall includes an aperture formed therein which receives the lens aperture of the recorder. A handle mounted on the shield facilitates conventional recording with the recorder. During the sporting activity, the recording unit is maintained intact within the pliable bag. However, the shield and recorder are removable as a single unit for conventional recording. The shield is configured to provide access to the controls, and the lens structure is not affected thereby. Therefore, a specialized recording unit is not necessary with the invention, and the participants' existing recorder units may be utilized, thus reducing the costs of the system and providing increased flexibility in the recording process.

The camera system of the invention provides video images and audio from the perspective of the participant wearing the helmet and the system. The participant merely positions the camera on the helmet, places the helmet on their head and the recording unit, and they are ready to record. Since the system utilizes a convention recording, there is not need to purchase a special recorder. Furthermore, the participant will have the convention recorder available which can be removed from the pack. The unique protective shield of the invention allows the camera to be used immediately without substantial assembly or disassembly to conventionally record other activities. The camber system is easy to war and is not cumbersome during the sports activity. When the activity is complete, the helmet may be rapidly disconnected from the system and removed without removal of other equipment. The unique mount structure of the invention and its interactions with a convention helmet provides a camera mount that does not require any additional equipment. Therefore, the system interferes very little with the activity.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIG. 3A is a side view of the recorder protective shield of the invention and FIG. 3B is an opposite side view of the recorded protective shield of the inventions;

FIG. 3C is an end view of the recorder protective shield of the invention and FIG. 3D is an opposite end view of the recorder protective shield of the invention.

DETAILED DESCRIPTION OF SPECIFIC EMBODIMENTS

Figure 1:
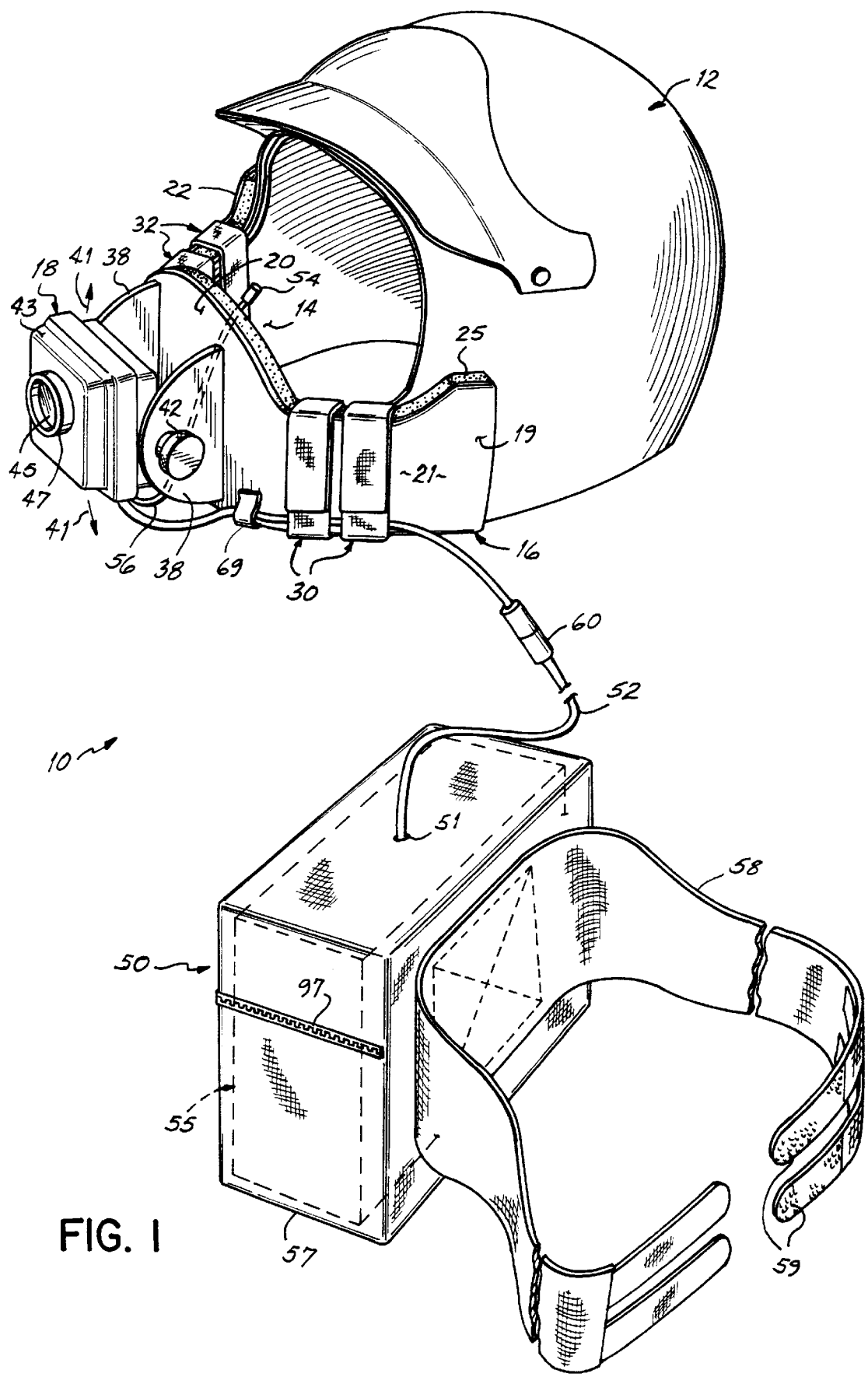
FIG. 1 is a perspective view of the camera system of the present invention installed on a helmet.

FIG. 1 illustrates a perspective view of the camera system of the present invention. Camera system 10 is utilized with a helmet structure 12, such as a safety helmet, which includes a forwardly projecting section 14, commonly referred to as a mouth guard or chin guard. The camera system 10 includes a mount structure 16 which engages the mouth guard 14 and maintains a camera 18 in a position that will capture a sporting activity from the perspective of a participant wearing helmet 12. Mount structure 16 is configured for being positioned proximate a mouth guard 14 of a helmet 12 and lies generally coextensive with a portion of the mouth guard.

Figure 2:
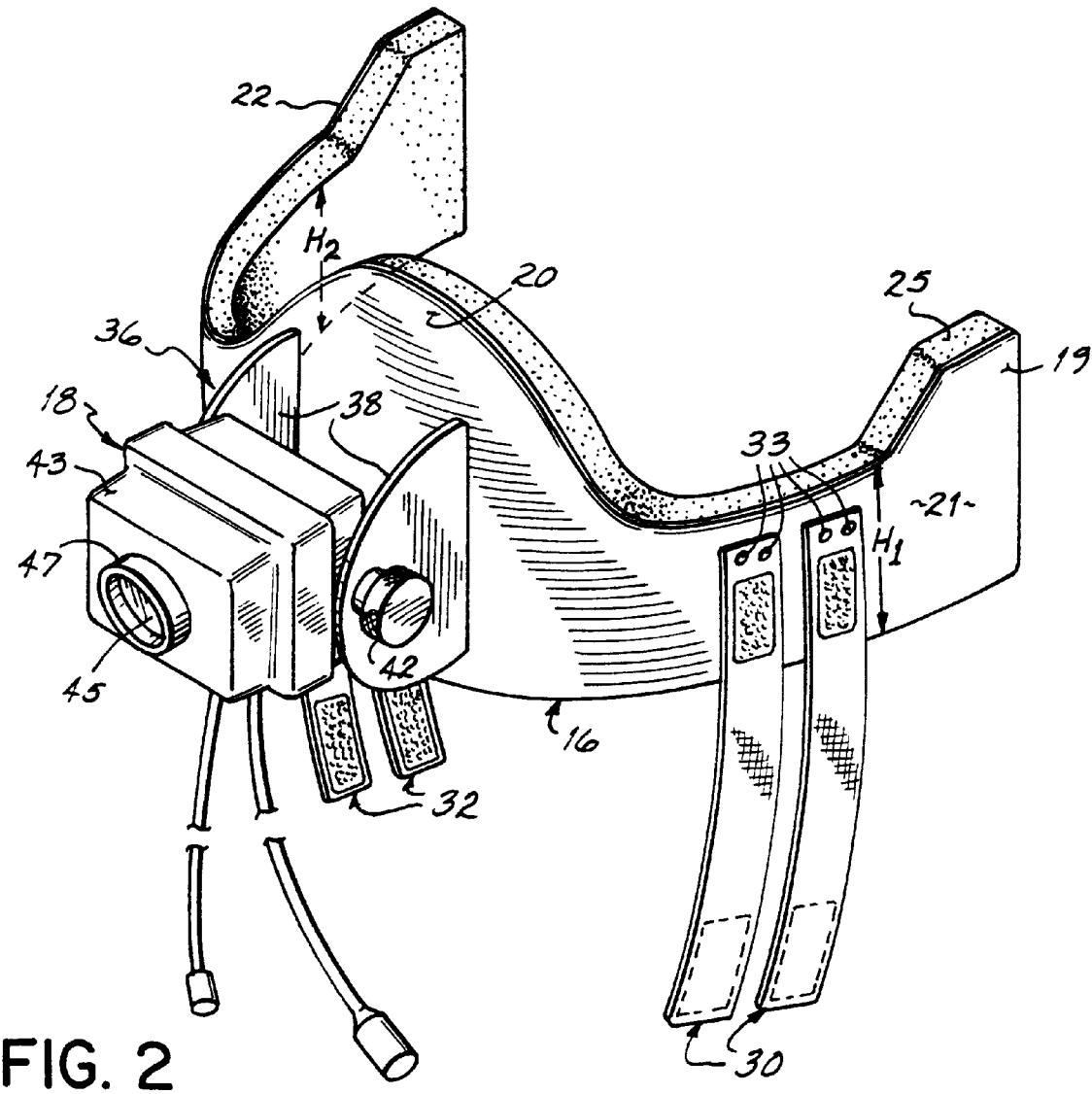
FIG. 2 is a perspective view of camera and mount structure of the system removed from the helmet and disconnected from the recording unit.

In the embodiment of the invention illustrated in FIG. 1, mount structure 16 is generally U-shaped and includes a front or mouth section 20 and opposite side sections 21, 22 (see FIG. 2). Mount structure 16 is configured to lie sufficiently coextensive with the mouth guard 14 and adjacent portions of helmet 12 such that the mount structure may be securely mounted thereto for stably holding camera 18 onto helmet 12. To that end, the heights $H_1$, $H_2$ of the corresponding side sections 21, 22 are preferably dimensioned to match the height of the mouth guard 14. Similarly, front section 20 is also dimensioned to preferably cover and lie coextensive with a substantial portion of the front section of mouth guard 14. Camera system 10 further comprises a securement device which is coupled to the mount structure 16 and is operable for securely engaging the mouth guard 14 to hold the mount structure 16 thereto as discussed further hereinbelow.

The mount structure preferably a flexible plastic shell 19, such as a PVC shell, which is durable and may be made in a variety of colors to improve the aesthetic look of the system. To absorb the shock of the sporting activity which the helmet 12 may undergo, mount structure 16 further includes a layer of foam material 25 which abuts against the outer surface of the helmet. Foam layer 25, in addition to insuring a more steady camera image, is also operable to ensure a more secure mounting a camera 18, because the soft foam follows the precise contours of the helmet mouth guard 14.

As illustrated in FIGS. 1 and 2, one securement device for the camera system 10 includes pairs of mounting straps 30, 32 which wrap around the mouth guard 14 of the helmet to the secure the mount structure 16 thereto. Mounting straps 30, 32 are secured to the mount structure 13 such as by rivets 33 or other suitable fasteners or adhesives. The mounting straps include hook and loop fastening structures 34 such as Velcro™, for tightly wrapping the straps 30, 32 around the mouth guard 14 and the mount structure 16. It will appreciated by persons of ordinary skill in the art that other fastening structures, such as buckles, might also be utilized to secure the straps 30, 32 around the mouth guard 14 and mount structure 16. Furthermore, clips (not shown) might be utilized rather than straps to secure the mount structure 16 to mouth guard 14.

Figure 2A:
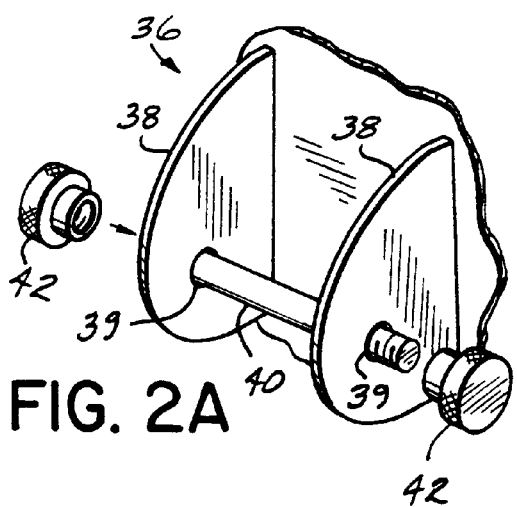
FIG. 2A is a perspective view of the adjustment system of the invention for tiltably adjusting the angle of the camera.

Camera 18 is secured to the mount structure 16 by an adjustment mechanism 36 comprising forwardly extending mounting tabs 38 having opposing apertures 39 which receive an axle 40 (see FIG. 2A). Axle 40 extends through a corresponding opening (not shown) formed in the outside casing 43 of camera 18 such that the camera may tilted vertically up and down on the helmet in the direction of arrows 41. In that way, the camera 18 may be adjusted so that it records a video image generally in the line of sight of a participant wearing helmet 12. That is, the sporting activity is captured or recorded from the perspective of the participant and as the participant would experience the sporting activity.

Camera 18 includes a semiconductor-based imaging device (not shown) such as VPC-710P available from ULTRACK of Denver, Colo. The camera imaging device is held within case 43 with the aperture of the device aligned with an aperture 45 formed in the case. Because of the small size of such imaging devices, camera 18 may be made small, lightweight and unobtrusive so that it does not interfere with the vision of the participant or the performance of the sporting activity. Camera 18 is also rugged and damage resistant. Case 43 is preferably formed of a hard plastic or metal to protect the camera device inside, thus providing a rugged camera 18 which is able to withstand a substantial amount of physical abuse, such as dropping of the helmet or an accident by the participant in which the camera gets knocked. Case 43 preferably includes an outstanding aperture ring 47 to prevent mud, water and other debris from blocking the aperture 45.

Camera system 10 further comprises a recording unit 50 which is coupled to camera 18 by an appropriate control line or record line 52. Record line 52 includes the appropriate audio and video lines necessary for recording the images and sounds of the activity. Camera system 10 further comprises a small microphone unit 54 which is mounted proximate the mouth guard 14 of the helmet 12 to record sounds generated generally inside helmet 12, such as the speech of the participant, while preventing extraneous outside sounds and noises, such as the wind passing by the helmet. In that way, clear voice signals are provided to the record unit 50 over line 52. Microphone unit 54 may be any suitable microphone device which is small enough to fit inside of mouth guard 14 without irritating or hindering the wearer. In accordance with the principles of the present invention, mount structure 16 includes an aperture 51 formed therethrough so that a microphone line 56 coupled to microphone 54 may extend therethrough and be coupled to the record line 52 inside camera case 43 by an appropriate coupling mechanism (not shown). In that way, record line 52 carries both audio and video signals to the recording unit 50 which includes a commercially available video recorder unit as discussed further hereinbelow.

Since all of the audio and video signals are directed to the recording unit 50 through record line 52, the connection between the helmet-mounted camera 18 and the recording unit 50 is very straight forward and uncomplicated and thus there is very little probability that a participant will connect the system improperly. The camera system is thus very easy to use and the camera 18 may be ready connected and disconnected by the participant.

Camera 18 of the invention may be adjusted to provide the proper angle for recording the sporting activity from the perspective of the participant as is desired. To that end, axle 40 has threaded ends which are coupled to knurled nuts 42 which are tightened on the threaded ends of axle 40 to force mounting tabs 38 inwardly to thereby securely grip case 43 of camera 18. In that way, the camera is locked into a particular view angle when the wing nuts 42 are tightened. The camera then views the sporting activity in the line of sight of the participant and movement of the participants head up, down, or sideways will further move the camera in that direction so that every scene which the participant sees is recorded.

The camera system 10 of the present invention further provides for easy disconnect of the camera 18 from the recording unit 50 so that the participant may remove helmet 12 while leaving the recording unit and any other associated recording electronics undisturbed. More particularly, recording unit 50 is worn by the participant and includes a pliable pouch 57 made of PAC cloth or a similar fabric for containing the recorder 55 (see FIG. 3A). Pouch 57 is connected to a body-engaging device such as belt 58 which includes a buckling structure such as hook and loop fasteners 59 or any other appropriate fastening structures. Recording unit 50 can thus be worn around the waist of the participant and is attached to camera 18 via record line 52. The pouch 57 contains the recorder 55 which is coupled with a rigid protective shield 70 as discussed further hereinbelow (see FIG. 3A) to protect the recorder.

In accordance with the principles of the present invention, a connecting plug 60 is provided in-line with record line 52 proximate mount structure 16 and helmet 12. Plug 60 may be any suitable video and audio connecting plug, such as an RCA plug, to provide for a quick connect and disconnect between the helmet 12 and the recording unit 50. the plug 60 is located very close to mount structure 16 so that the invention provides for easy removal of the helmet without removal of the recording unit 50 or any other associated sporting gear which may be covering the recording unit 50, such as a jacket or other articles of clothing. The plug is simply disconnected and the helmet may be removed. When the participant is ready to again resume the sporting activity, the plug 60 allows for quick connect once the helmet has been placed on the participant's head. In a preferred embodiment as illustrated in FIG. 1, the wire portion of line 52 attached to the helmet is secured by a clip 69 to the mount structure 16 and is held by straps 30, 32 against the mount structure so as not to flap around annoyingly when the participant continues to wear the helmet with the recorder disconnected. Clip 69 and the straps 30, 32 further remove any tension on the cable at its point of connection to microphone 54 and the camera device within the case 43. The participant does not waste time untangling various wires and making various different connections in order to record the audio and video of the sporting activity. Once the helmet is in position, plug 60 may be connected in a single step to connect camera 18 and microphone 54 to the recording unit 50 for capturing the activity.

As previously mentioned, the pouch 57 which is included as part of the recording unit 50 contains a recorder 55 therein which is illustrated in phantom in FIGS. 3A, 3B, 3C and 3D. Within pouch 57 the recorder 55 is mounted to protective shield 70 which protects the recorder unit during use and also provides a suitable base structure for operation of the recorder unit apart from the camera system of the invention as is conventional. For example, camera system of the present invention may be utilized to record a sporting activity from the view of the participant. Once the participant has completed the activity, he may remove the recorder 55 from pouch 57, disconnect it from the camera 18 via plug 60 and then record other participants in the activity in the same way that a conventional video camera recorder would be utilized.

Referring to FIG. 3A, shield 70 is constructed in accordance with the principles of the present invention to provide for rapid deployment of recorder 55 upon its removal from the pouch without any additional steps necessary to record other than those completed within a stand-alone recorder. When the participant is again ready to record is participation, he may place the recorder and shield within the pouch 57 and then connect camera 18 to the recorder by plug 60 in line 52. When the recorder is inside of pouch 57, shield 70 protects it from damage, such as, through a fall onto the pouch or a collision between the participant's equipment and the pouch.

Referring to FIG. 3A, shield 70 is shown enveloping recorder 55 in accordance with the principles of the invention. Shield 70 is preferably formed of a thin, yet strong sheet metal, which includes a base 71, side walls 72, 74 and end walls 76, 78 (see FIGS. 3C, 3D). Recorder 55 mounts to base 71 with a bolt 80, which fits through an appropriately formed opening (not shown), in base 71. Bolt 80 runs into threaded hole in the bottom of the recorder 55, and most commercially available have such a hole for use with a tripod or other mounting equipment.

The hole formed in the base 71 may be slotted to provide for forward or backward adjustment of the recorder 55 within the shield 70.

Side wall 72 is formed to provide for access to the operational controls and the inputs of recorder 55 in accordance with the principles of the present invention.

More specifically, the side wall 72 includes a cut out defined by edges 81 to provide access to the camera controls illustrated in phantom by box 82. A finger cut 83 out provides greater access to controls 82. Referring to FIG. 3B, the opposing side wall 74 includes a handle 84 which may be formed by a passing strap through slots 85 formed in the side wall. Handle 84 allows the participant to cradle and hold the recorder and shield as a unit much the same way that a recorder might be utilized. Since recorder 55 is mounted to shield 70, the entire assembly may be moved in uniform and recorder 55 may be pointed without concern for shield 70. As is convention, the view finder 86 of recorder 55 is utilized to obtain a picture through the lens aperture 87. Lens aperture 87 will usually includes a lens cover (not shown) and used with the camera system 10 of the invention to prevent damage to the lens while in use. Recorder 55 illustrated in the drawings as a 8 mm Camcorder; however, other commercially available recorder units might also be utilized. Side wall 72 further includes an input aperture 88 for receiving line 52 so that it may be plugged into the appropriate audio and video inputs for the camera. Most recorders 55 include an audio in port and a video in port so that the recorder may be utilized to record from another source, such as a VCR. With the present invention, audio from the microphone and video from the camera 18 are input into the appropriate ports (not shown). Line 52 passes through an appropriately formed opening 51 in pouch 57.

The magnetic tape containing the recorded audio and video may be ejected from the recorder 55 generally on one side of the recorder as indicated by reference numeral 90. Side wall 74 is preferable spaced from side 90 of the recorder to allow the ejection apparatus of the recorder sufficient room to move. Generally, tapes are rejected by a drawer or sleeve (not shown) which slidably receives the tape which is well known in the art.

Referring to FIG. 3C, the back wall 76 is appropriately formed to provide access to the back of the recorder for the participant to move the viewfinder 86 and mount appropriate power pack (not shown). Most conventional video camera recorders utilize rechargeable power packs which are clipped to the recorder. A cut out indicated by reference numeral 92 is formed in the end wall 76 so that the battery pack 94 may be mounted to the back of a camera. The battery pack of the 8 mm recorder illustrated in the drawings attaches by being pushed toward the end of the recorder and slid to the right as viewed in FIG. 3C to click into position. Cut out 92 allows the power pack to be appropriately assembled.

Camera 18, and specifically the camera device mounted within case 43 requires an external power source and is appropriately powered through line 52. One suitable power source may be provided by a series of batteries 100 which are appropriately coupled together to form a battery pack. Shield 70 is configured such that side wall 74 is appropriately situated to provide for mounting of batteries 100 within the shield between the recorder and side wall 74. In that way, the recorder, shield, and appropriate power sources are contained in a unitary structure which may be removed and replaced with pouch 57 in a single step. The present invention eliminates any need to assemble and position separate batteries or other power sources with recorder 55 to facilitate easier use of the recorder apart from the system 10 of the invention. Recorder 55 may be removed and replaced in one easy step to further enhance the versatility of camera system 10 of the invention.

Referring to FIG. 3D, end wall 78 is appropriately formed with a cut out 96 to receive aperture 86 of the recorder. In that way, the recorder is not to be removed from shield 70 when used as a stand-alone unit further enhancing its versatility as discussed above. After a participant has completed a particular sporting activity, he may stop and disconnect the helmet mounted camera by disconnecting plug 60. Then pouch 57 may be opened such as by zipper 97 (see FIG. 1) and recorder 55 may be removed to tape a second party participating in the activity, albeit from a traditionally recorded perspective. Line 52 may be unplugged from recorder 55 when it is used in the stand alone mode. However, line 52 might also be left dangling without substantially interfering. In that way, the participant is ready to use the invention simply by attaching the helmet-mounted camera 18 to the recording unit 50 via plug 60.

Camera system 10 is versatile and easy to use while the participant is engaged in the sporting activity and the camera 18 of the system is adjustable to provide a recordation of video images in the line of sight of the participant. Audio images are also captures so that the participant may provide narration for the video. Camera system 10 interferes very little with the necessary equipment utilized in the activity and in fact incorporates into a standard helmet having a mouth guard which is worn on the head of the participant during sporting activities.

The camera system is easy to operate during the activity and is not cumbersome to wear. Once the participant has completed the activity or is taking a break in between sessions of the sporting activity, the helmet containing the camera of the system may be removed and disconnected from the recording unit in one simple disconnecting step. The conventional recorder of the invention may then be utilized to capture other scenes of the activity from a different perspective without any substantial disassembly of the system. When the participant is ready to resume the sporting activity, the helmet-mounted camera may be readily connected to the recording unit to further capture the activity. Thus, the present invention provides a means for capturing the sporting activity from the perspective of the participant while encumbering the participant very little in that activity.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A camera system for capturing a sporting activity from the perspective of the participant and mountable on a safety helmet having a mouth guard, the camera system comprising:

a mount structure configured for being positioned proximate a mouth guard of a safety helmet to lie generally coextensive with a portion of the mouth guard;

a securement device coupled to the mount structure and operable for securely engaging the mouth guard to hold the mount structure thereto;

a camera operable for capturing a video image;

an adjustment mechanism coupled to the mount structure and configured for receiving the camera, the adjustment mechanism maintaining the camera in a generally forward direction of the helmet when the mount structure is secured to the helmet;

the adjustment mechanism tiltably engaging the camera for vertically moving the camera up and down on the helmet such that the camera records generally in a line of sight of a participant wearing the helmet.

2. The camera system of claim 1 wherein the mount structure includes a U-shaped element configured for lying across the front and sides of the mouth guard for stably mounting the camera thereto.

3. The camera system of claim 1 wherein the securement device includes a strap operable for surrounding a portion of the mouth guard and holding the mount structure thereto.

4. The camera system of claim 1 wherein the adjustment mechanism includes an axle element engaging the camera, the camera rotating about the axle element for vertical movement on the helmet.

5. The camera system of claim 1 wherein the mount structure includes a generally rigid outside layer and a yieldable inner layer for engaging the helmet.

6. The camera system of claim 1 further comprising a recorder operably coupled to the camera for recording the video image captured by the camera.

7. The camera system of claim 6 further comprising a record line for coupling the camera and recording unit together and a disconnect structure in-line with the record line, the disconnect structure located proximate the mount structure for readily disconnecting the camera from the recording unit such that a helmet worn by a participant may be removed without significantly disturbing the recording unit.

8. The camera system of claim 6 further comprising a protective shield operatively coupled to the recorder to protect a portion of the recorder, the recorder including at least one control button, the protective shield including a cut away section proximate the control button for providing access to the button while the shield is coupled to the recorder such that the recorder is readily usable apart from the camera.

9. The camera system of claim 6 further comprising a protective shield operatively coupled to the recorder to protect a portion of the recorder, the recorder including at least one input port to receive a signal input from a record line coupled to the camera, the protective shield including a cut away section proximate the input port for providing access to the port while the shield is coupled to the recorder.

10. The camera system of claim 6 further comprising a protective shield operatively coupled to the recorder to protect a portion of the recorder, the system including a power source coupled to the camera, the protective shield being configured for holding the power source proximate the recorder when the shield is coupled to the recorder.

* * * * *